United States Patent

[11] 3,604,433

| [72] | Inventor | Ernst F. Notthoff |
| | | Canoga Park, Calif. |
| [21] | Appl. No. | 794,246 |
| [22] | Filed | Jan. 27, 1969 |
| [45] | Patented | Sept. 14, 1971 |
| [73] | Assignee | California Car Wash |
| | | Sun Valley, Calif. |

[54] WHEEL WASHING APPARATUS
10 Claims, 2 Drawing Figs.

[52] U.S. Cl. .................................................. 134/45,
134/47, 134/184
[51] Int. Cl. ..................................................... B08b 3/04
[50] Field of Search ........................................... 134/45, 47,
195, 196, 184

[56] References Cited
UNITED STATES PATENTS
300,398  6/1884  Rudd ........................... 134/195

| 1,140,561 | 5/1915 | Baer ........................... | 134/184 X |
| 3,360,400 | 12/1967 | Evans et al. ................... | 134/184 X |
| 3,419,022 | 12/1968 | Youngren, Sr. et al. ....... | 134/45 |
| 3,446,217 | 5/1969 | Collier .......................... | 134/45 |

*Primary Examiner* — Robert L. Bleutge
*Attorney* — Fulwider, Patton, Rieber, Lee & Utecht ABSTRACT: Wheel washing apparatus comprising first and second nozzle means disposed in sequence, adjacent the path of an automobile for washing a tire thereof. Cylinder means is provided for delivering pressurized cleaning fluid to the first nozzle means when the tire is disposed there in front of for washing one-half the outer wall of such tire and subsequently providing pressurized cleaning fluid to the second nozzle means when such tire is disposed there in front of for washing the second half of such outer wall.

PATENTED SEP 14 1971

3,604,433

INVENTOR.
ERNST F. NOTTHOFF
BY Fulwider, Patton, Rieber,
Lee and Utecht
ATTORNEYS

3,604,433

WHEEL WASHING APPARATUS

BACKGROUND OF THE INVENTION

1. Field of the Invention

The present invention relates to apparatus for automatically washing the tires of an automobile being moved through a washing rack.

2. Description of the Prior Art

Conventional tire washing apparatus generally include rather elaborate framework for moving brushes into engagement with the wall of the tire for scrubbing dirt and scuff marks therefrom. Tire washing devices have also been proposed which include nozzles disposed adjacent the path of the car for spraying water onto the tires. There are, however, no tire washing devices known to applicant which include first and second nozzle means disposed along the path of an automobile and connected with cylinder means for delivering pressurized cleaning fluid to the first nozzle means when a tire rolls thereinfrontof to wash one-half the outer wall of such tire and to subsequently provide pressurized cleaning fluid to the second nozzle means to wash the other half of such tire.

SUMMARY OF THE INVENTION

The present invention is characterized by first and second nozzle means disposed adjacent the path of an automobile and coupled with cylinder means for providing pressurized cleaning fluid to the first nozzle means when an automobile tire passes there in front of to wash one-half the exterior wall of such tire and to subsequently provide pressurized cleaning fluid to the second nozzle means to wash the second half of such exterior wall.

The objects and advantages of the present invention will become apparent from a consideration of the following description when taken in conjunction with the accompanying drawing.

DESCRIPTION OF THE PREFERRED EMBODIMENT

Figure 2:
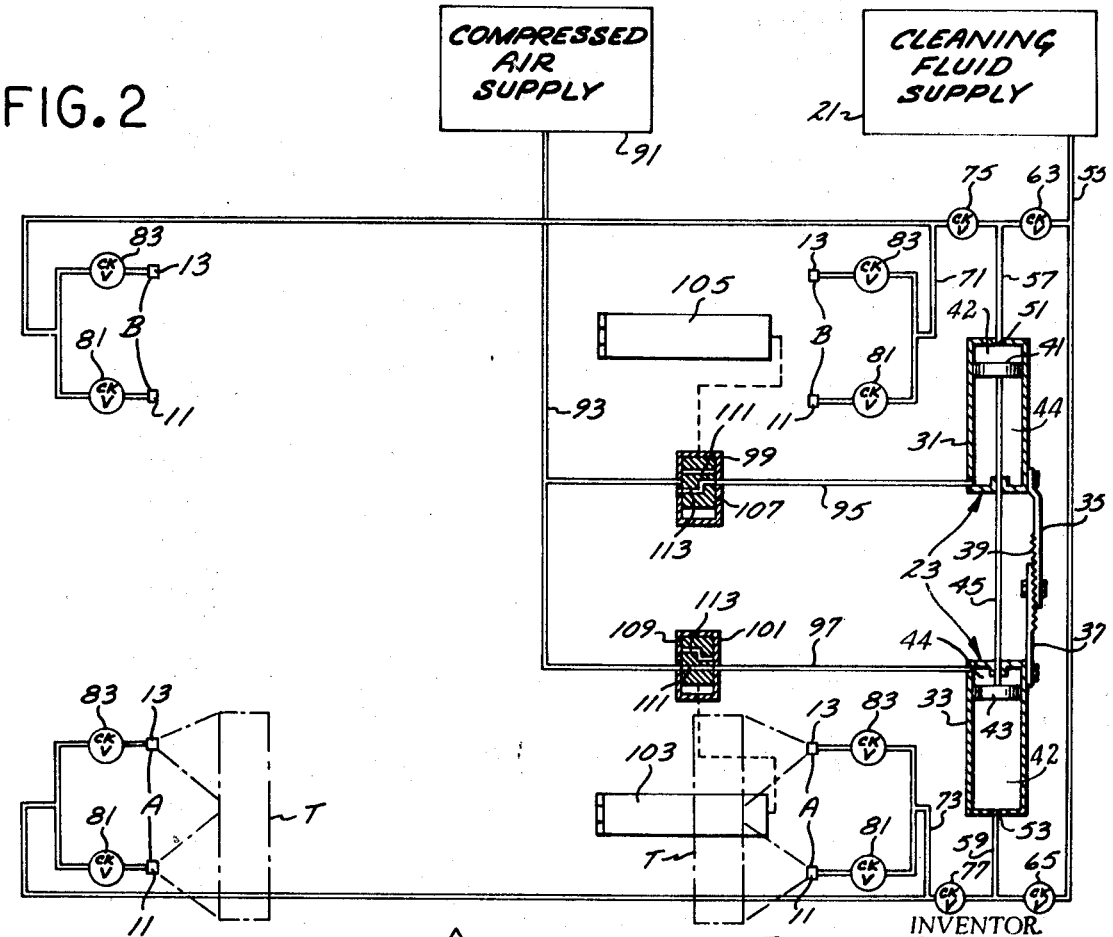
FIG. 2 is a schematic view of said tire washing apparatus.

Referring to FIG. 2, the tire washing apparatus of present invention includes first and second pairs A and B of nozzles 11 and 13, disposed on each side of the path of an automobile, which automobile may be entering a washing rack. Cleaning fluid is provided from a container 21 through cylinder means 23 which effects pressurization thereof and delivery first to the nozzles 11 and 13 of the pair A to wash one-half the exterior side wall of a tire T as it rolls thereby and then effects delivery to the pair B to wash the remaining half of the exterior side wall of such tire T.

Figure 1:
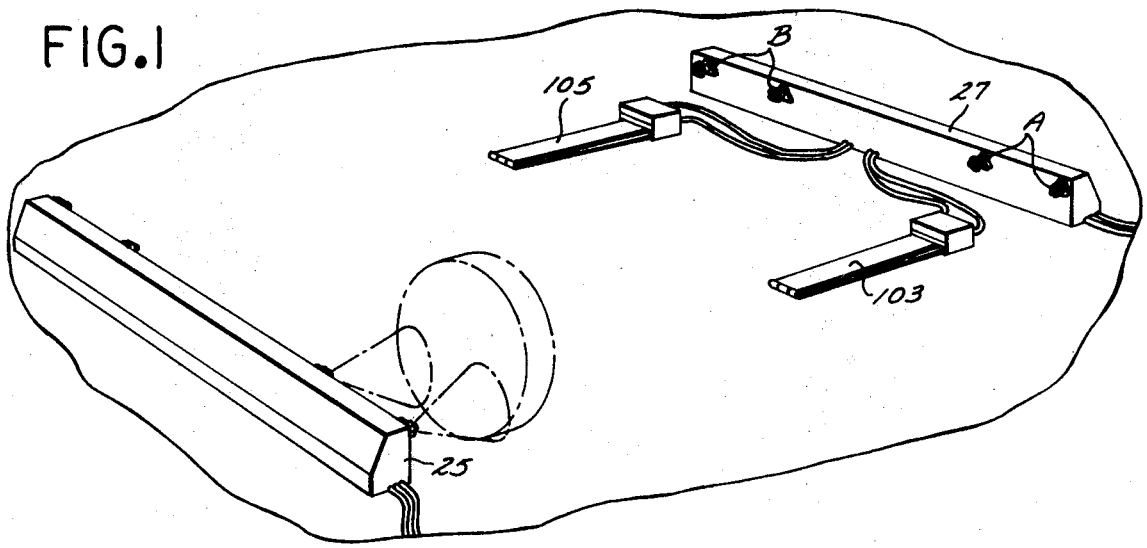
FIG. 1 is a fragmentary perspective view of a tire washing apparatus embodying the present invention.

Referring to FIG. 1, the nozzles 11 and 13 are mounted in mounts 25 and 27 disposed on opposite sides of the automobile path. Referring to FIG. 2, the cylinder means 23 includes a pair of cylinders 31 and 33 which are connected together by adjustment arms 35 and 37 having cooperating serrations 39 therein. The cylinders 31 and 33 include pistons 41 and 43 which divide the cylinders into respective cleaning fluid-receiving compartments 42 and pressurization compartments 44 and are coupled together by a connecting rod 45.

The cleaning fluid container 21 is connected with ports 51 and 53 in the cylinders 31 and 33 by means of conduits 55, 57 and 59. Included in such conduits are check valves 63 and 65 which permit flow from the container 21 to the respective cylinders 31 and 33 bit but check flow in the reverse direction. The cylinder ports 51 and 53 are also connected with the respective nozzles 11 and 13 by means of conduits 71 and 73. Included in the conduits 71 and 73 are check valves 75 and 77 which permit flow from the cylinders 31 and 33 toward the nozzles 11 and 13 but check flow in the reverse direction.

Located adjacent the nozzles 11 and 13 are pressure relief valves 81 and 83 which close at a selected pressure to block flow to the respective nozzles 11 and 13 and prevent drainage but open when the pressure is increased above such selected pressure to enable the cylinder means 23 to deliver pressurized fluid to such nozzles.

A container 91 of compressed air is connected with the adjacent ends of the cylinders 31 and 33 by means of conduits 93, 95 and 97. The conduits 95 and 97 include control valves 99 and 101 which are coupled with respective treadles 103 and 105 disposed in the path of the tire T. The valves 99 and 101 include spools 107 and 109 having pressurization passages 111 and exhaust passages 113 therein.

In operation, when the tire T engages the first treadle 105, the spool 109 will be shifted to the position shown in FIG. 2 for communicating air from the air supply 91 to the cylinder 33 thereby driving the piston 43 downwardly. Such pressurization of the cylinder 33 forces cleaning fluid therefrom and out the pair A of nozzles 11 and 13 for impingement on the tire T. This spray of cleaning fluid will cover a little more than one-half the exterior wall of the tire T as such tire rolls thereby. When the piston 43 is driven downwardly, the piston 41 will also be pulled downwardly to pull a new charge of cleaning fluid into the upper end of the cylinder 31.

When the tire T rolls off the treadle 105, the spool 109 will return to its exhaust position to vent pressure from above the piston 43 to ready such piston for being returned to the position shown in FIG. 2.

When the tire T reaches the second treadle 103, the spool 107 will be shifted to pressurize the cylinder 31 below the piston 41 to force such piston upwardly and provide pressurized cleaning fluid to the pair B of nozzles 11 and 13 for cleaning the second half of the tire T. Such upward movement of the piston 41 will pull the piston 43 upwardly and draw a new charge of cleaning fluid into the cylinder 33 in preparation for the subsequent car.

It will be noted that the arm 35 and 37 may be adjusted to space the cylinders 31 and 33 farther apart to increase the amount of cleaning fluid drawn thereinto during each stroke of the pistons 41 and 43.

From the foregoing it will be apparent that the tire washing apparatus of present invention is straightforward in design and economical to manufacture. Such tire washing apparatus provides for a long service free life and effects cleaning of the tire while the automobile continues to move thereby.

I claim:

1. Wheel washing apparatus for automatically washing the tire of a motor vehicle moving along a predetermined path, said apparatus comprising;

first nozzle means disposed on one side of said path and directed toward said path for washing one-half of the outer wall of a said tire;

second nozzle means disposed on said one side of said path for washing the second half of the outer wall of said tire;

cylinder means having first and second cleaner fluid ports at its opposite ends and including piston means reciprocable in one direction to pull cleaning fluid in said one port while ejecting fluid out said second port and reciprocable in the opposite direction to pull cleaning fluid in said second port while ejecting it out said first port;

a cleaning fluid container;

conduit means connecting said container with said first and second ports and also connecting said first and second ports with said first and second nozzle means, respectively; and flow control means in said conduit means enabling flow from said cleaning supply to said ports and blocking flow from said ports to said cleaning supply, said control means further enabling flow from said first and second ports to said respective nozzles and blocking flow from said nozzles to said ports; and actuating means for driving said piston means in said opposite direction when said tire is confronting said first nozzle means and in said one direction when said tire is confronting said second nozzle means.

2. Wheel washing apparatus as set forth in claim 1 wherein; said cylinder means includes first and second cylinders having respective first and second pistons therein.

3. Wheel washing apparatus as set forth in claim 1 wherein: said control means includes treadle means disposed in the path of said tire.

4. Wheel washing apparatus as set forth in claim 2 wherein: said pistons means are connected together and said cylinder means includes adjustment means connecting said first and second cylinders together for adjustment of said cylinders to set the stroke of said pistons.

5. Wheel washing apparatus as set forth in claim 2 wherein: said actuating means includes an air source connected with said cylinder means and valve means responsive to said actuating means for rendering said air source communicative with said cylinder means.

6. Wheel washing apparatus as set forth in claim 2 wherein: said actuating means includes an air source connected with said cylinder means and valve means for alternately applying pressure to one piston and then to the other.

7. Wheel washing apparatus as set forth in claim 6 wherein: said actuating means include first and second treadles disposed in the path of said tire coupled with said valve means, and arranged for depression by said tire to provide cleaning fluid to said respective first and second nozzle means when said tire is disposed in confronting relationship with said respective first and second nozzle means.

8. Wheel washing apparatus for automatically washing a tire of a motor vehicle moving along a predetermined path, said apparatus comprising:

nozzle means disposed on one side of said path and directed toward said path to wash the outer wall of said tire;

cylinder means including a housing formed with a chamber having a piston therein for dividing said chamber into a cleaning fluid compartment and a pressurization compartment including respective fluid and pressurization ports, said piston being movable in one direction to draw cleaning fluid into said cleaning fluid compartment and in the opposite direction to force fluid from said cleaning fluid compartment;

drive means for driving said piston in said one direction;

a cleaning fluid container;

cleaning fluid conduit means connecting said container with said cleaning fluid port;

pressurization means;

conduit means connecting said pressurization means with said pressurization port;

a pressurization control valve in said pressurization conduit means for controlling pressurization of said pressurization compartment; and spray control means disposed in said path and responsive to movement of said car therealong to activate said pressurization control valve to pressurize said pressurization compartment and drive said piston in said opposite direction to force cleaning fluid out of said cleaning fluid compartment and through said nozzle means to be sprayed on said tire.

9. Wheel washing apparatus as set forth in claim 8 that includes:

flow control means in said cleaning fluid conduit means for blocking fluid flow from said fluid compartment to said cleaning fluid container and for blocking fluid flow from said nozzle means to said fluid compartment.

10. Wheel washing apparatus as set forth in claim 8 wherein:

said piston drive means includes a pressure cylinder having its piston connected with the first-mentioned piston and means for pressurizing said cylinder.